(12) United States Patent
Kreutzkaemper et al.

(10) Patent No.: US 9,341,310 B2
(45) Date of Patent: May 17, 2016

(54) PUMP FOR CONVEYING A MEDIUM AND LUBRICATING SYSTEM CONTAINING THE SAME

(75) Inventors: Jürgen Kreutzkaemper, Berlin (DE); Paul Sattelberger, Reilingen (DE); Stefan Schürmann, Walldorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 1012 days.

(21) Appl. No.: 13/301,840

(22) Filed: Nov. 22, 2011

(65) Prior Publication Data

US 2012/0132287 A1    May 31, 2012

(30) Foreign Application Priority Data

Nov. 25, 2010   (DE) .......................... 10 2010 061 916

(51) Int. Cl.
| | | |
|---|---|---|
| *F17D 3/00* | (2006.01) | |
| *E03B 7/07* | (2006.01) | |
| *F04B 49/00* | (2006.01) | |
| *F16N 27/00* | (2006.01) | |
| *F04B 15/02* | (2006.01) | |
| *F04B 17/02* | (2006.01) | |
| *F04B 49/08* | (2006.01) | |

(52) U.S. Cl.
CPC ............... *F16N 27/00* (2013.01); *F04B 15/02* (2013.01); *F04B 17/02* (2013.01); *F04B 49/08* (2013.01); *F16N 2210/02* (2013.01); *F16N 2210/14* (2013.01); *Y10T 137/0318* (2015.04); *Y10T 137/85954* (2015.04)

(58) Field of Classification Search
USPC .................. 184/6.26, 6.11; 417/306, 307, 309
See application file for complete search history.

(56) References Cited

U.S. PATENT DOCUMENTS

| 2,991,845 | A | | 7/1961 | Scheffler, Jr. | |
|---|---|---|---|---|---|
| 4,520,902 | A | * | 6/1985 | Snow | 184/7.4 |
| 4,976,335 | A | * | 12/1990 | Cappellato | 184/6.4 |
| 5,285,871 | A | * | 2/1994 | Sievenpiper | 184/7.4 |
| 5,971,107 | A | * | 10/1999 | Stitz et al. | 184/7.4 |
| 7,063,734 | B2 | * | 6/2006 | Latulipe et al. | 96/189 |
| 2001/0030084 | A1 | * | 10/2001 | Conley et al. | 184/26 |

FOREIGN PATENT DOCUMENTS

| DE | 4442188 C1 | 8/1996 |
|---|---|---|
| DE | 19721823 A1 | 7/1998 |
| DE | 202007005273 U1 | 10/2007 |
| DE | 102009014922 A1 | 9/2010 |

(Continued)

*Primary Examiner* — William E Dondero
*Assistant Examiner* — Mark K Buse
(74) *Attorney, Agent, or Firm* — Bryan Peckjian; SKF USA Inc. Patent Dept.

(57) ABSTRACT

A pump for conveying a medium comprises a pump chamber having an intake opening and an outlet opening. A movable component is movably disposed in the pump chamber in order to convey a batch of the medium, which is located in the pump chamber, from the intake opening to the outlet opening. A ventilation device has a ventilation opening in fluid communication with the pump chamber. The ventilation opening is different from the intake opening and the outlet opening. The ventilation device is configured to reduce or at least substantially prevent, at least temporarily, the formation of a partial vacuum or a negative pressure in the pump chamber.

20 Claims, 3 Drawing Sheets

(56) References Cited

FOREIGN PATENT DOCUMENTS

| EP | 0715118 | A1 | 6/1996 |
| EP | 1130221 | A1 | 9/2001 |
| EP | 1389671 | A2 | 2/2004 |
| FR | 2561352 | A1 | 9/1985 |

* cited by examiner

PUMP FOR CONVEYING A MEDIUM AND LUBRICATING SYSTEM CONTAINING THE SAME

CROSS-REFERENCE

This application claims priority to German patent application no. 10 2010 061 916.7 filed on Nov. 25, 2010, the contents of which are incorporated herein by reference as if fully set forth herein.

TECHNICAL FIELD

The present invention generally relates to a pump for conveying a medium, a lubricating system containing the same and a method for conveying a medium, for example, a substantially incompressible fluid material, such as a liquid, a lubricant, a grease, an oil, an emulsion or fine-grained granules.

BACKGROUND ART

In many machines, the conveying of a medium is an important task that is necessary to maintain the proper functioning and operation of the machine. For example, a cooling medium and/or a lubricant often must be transported to one or more locations within the machine. In the case of lubricants, such locations are often bearings, such as roller bearings or slide bearings, or other regions of the machine, in which individual machine elements move relative to each other. The lubricant reduces friction between the relatively-moving machine elements and/or cools the machine elements.

However, it is often necessary to precisely tune the individual components of such a lubricating system relative to each other, in order to ensure as much as possible that a sufficient amount of the lubricant is present at or near the machine elements in need of lubrication under all operating conditions. Thus, it is usually necessary to tune or adjust the system for supplying fresh lubricant to the machine element and the system for discharging or exhausting used lubricant to ensure that equal amounts of lubricant are being supplied to and discharged from the area in need of lubrication, even though it may be very costly to do so, in order to prevent an under- or oversupply of the lubricant.

In particular, in the case of mechanical components that move relative to each other, in which lubrication is provided for reducing wear, a tuning of the lubricant supply and the accompanying used lubricant discharge is usually required.

DE 44 42 188 C1 and DE 20 2007 005 273 U1 (and its counterpart US 2010/0322543 A1) describe lubricant suction pumps, with which used lubricant is suctioned away from the machine elements in need of lubrication in a specific manner. However, in such systems, the danger of insufficient lubrication exists that can lead, in turn, to increased wear and thus to an increased deterioration and a reduced service life of the particular machine elements as well as the machine as a whole.

Often the structure and the upkeep of such a system requires a construction and manufacturing with especially low tolerances as well as a costly tuning during the assembly and a costly upkeep during the subsequent operation.

SUMMARY

Therefore, the present teachings disclose, inter alia, an improved pump for conveying a medium, a lubricating system containing the same and an improved method for conveying a medium.

In one aspect of the present teachings, a pump for conveying a medium preferably comprises a pump chamber having an intake opening and an outlet opening, as well as a movable component, which is disposed so as to be movable at least partially in the pump chamber, in order to convey a batch of the medium, which is located in the pump chamber, from the intake opening to the outlet opening. The pump may further comprise a ventilation device having a ventilation opening in the pump chamber that is different from the intake opening and the outlet opening. The ventilation device is preferably configured to reduce or at least substantially prevent, at least temporarily, the formation of a partial vacuum (negative pressure) in the pump chamber.

The ventilation device may be configured to selectively permit a gas or a gas mixture to flow into the pump chamber via the ventilation opening in order to counteract any partial vacuum or negative pressure that has formed in the pump chamber. In addition or in the alternative, the ventilation device may be configured and/or arranged such that the movable component substantially simultaneously closes and opens the ventilation opening and the intake opening. In addition or in the alternative, the ventilation device may comprise a ventilation valve that is configured to open when a predetermined pressure difference between the pump chamber and a reference pressure is exceeded.

In addition or in the alternative, the pump may be configured such that the movable component moves away from a base position cyclically or periodically and this movement includes a first and second movement phase. In this case, the pump may be configured to move the movable component away from the base position and thus convey the batch of the medium from the pump chamber to the outlet opening during the first movement phase, and to return the movable component to the base position during the second movement phase. The ventilation device is preferably configured to reduce or at least substantially prevent the formation of the partial vacuum in the pump chamber during the second movement phase.

The pump may be a piston pump, in which the movable component is a piston. In this case, the pump chamber preferably includes at least one cylindrical-shaped segment, within which the piston at least partially extends in a movable manner.

In the alternative, the pump may be a rotary vane pump and the movable component may be a rotary vane.

In another aspect of the present teachings, a method for conveying a medium preferably comprises receiving a batch of the medium in a pump chamber through an intake opening of the pump chamber, conveying the batch of the medium to an outlet opening of the pump chamber and at least temporarily ventilating the pump chamber in order to reduce or at least substantially prevent the formation of a partial vacuum (negative pressure) in the pump chamber.

The machine element may be, e.g., a bearing of a wind turbine, a tidal power system, a turbine or a construction machine.

In addition or in the alternative, the lubricating system may further include an input pump coupled with or in fluid communication with the machine element so as to convey a lubricant to a lubricant supply of the machine element.

The pump may be a piston pump, in which the movable component is a piston. Further, the piston may be coupled or in fluid communication with the input pump, such that the piston is moved from a base position to convey the batch of lubricant from the pump chamber through the outlet opening when the piston is subjected to a conveying pressure supplied by the input pump. The pump may also include a return element, such as a spring, e.g., a compression spring or a tension spring, which is configured move the piston back to the base position when the conveying pressure decreases.

In another aspect of the present teachings, a lubricating system for conveying a batch of lubricant away from a machine element comprises the above-described pump, wherein a lubricant exhaust (e.g., a corresponding connector) of the machine element is coupled with the intake opening of the pump in order to convey used lubricant out of the machine element. The lubricating system further comprises a connector for a used lubricant collection container. The connector is coupled or in fluid communication with the outlet opening of the pump to provide the used lubricant conveyed by the pump to the collection container. The lubricating system is preferably configured to receive the used lubricant that output from the machine element in the pump chamber of the pump via the intake opening without the formation of a negative pressure or a partial vacuum in the pump chamber of the pump. For example, the used lubricant may be conveyed from the machine element to the pump chamber of the pump, e.g., by a centrifugal force, an inertial force, a diffusion force or gravity, i.e. by force other than a suction or vacuum force. Preferably, the used lubricant always remains at or near atmospheric pressure during its movement from the machine element to the used lubricant collection container.

In certain embodiments of the present teachings, a costly tuning or adjustment of the system can be simplified and/or a lubricating supply system can be improved by using a pump according to the present teachings, such that a batch of the to-be-conveyed medium is received in the pump chamber without creating a partial vacuum in the pump chamber. In other words, the medium to be conveyed, e.g., a lubricant, is not suctioned by a pump (e.g., a vacuum pump), but rather arrives in the pump chamber of the pump as a result of an "unpressurized" transport. Therefore, the medium can be conveyed to the outlet opening of the pump while being substantially "unpressurized", i.e. it is at or nearly at atmospheric pressure. The creation of a partial vacuum (negative pressure) in the pump chamber can be prevented by the ventilation device, which is configured to reduce or at least substantially prevent, at least temporarily, the formation of such a partial vacuum (negative pressure) in the pump chamber.

As a result, a costly operation necessary to tune or adjust of the amount of lubricant supplied to a machine component so as to be precisely equal to the amount of lubricant suctioned out of the machine component, which was required in prior art devices, can be omitted, if desired. Furthermore, in certain embodiments of the present teachings, it may often be possible to completely avoid having to perform such a tuning, since the pump is not actively suctioning. Therefore, the risk of an insufficient supply of the medium, e.g., a lubricant, to or within the machine component in need of lubrication, which is caused by suctioning too much used lubricant out of the machine component, is reduced. As a result, undesired complications, such as an insufficient lubrication and thus increased wear, can be prevented.

Further objects, embodiments, advantages and designs will be explained in the following with the assistance of the exemplary embodiments and the appended Figures.

DETAILED DESCRIPTION OF THE INVENTION

Before explaining the exemplary embodiments of the present teachings in more detail, it is noted that, in principle, the present teachings are not limited to lubricating systems, even though the following description is focused on exemplary embodiments in connection with lubricating system and corresponding pumps. In addition, in the context of the present description, a lubricant, e.g., an oil or a grease, is often mentioned in an exemplary manner as the medium. However, in principle, the present invention is not limited to such media. Therefore, for example, a pump according to certain embodiments of the present teachings is also suitable for conveying other types of media, as are mentioned above and below.

For example and without limitation, any medium or fluid, which is substantially incompressible, can be utilized with the present teaching, such as e.g., a liquid, liquid-like material or another viscous material. In this respect, not only the already-mentioned greases are included within the scope of the present teachings, but also e.g., other liquids, such as emulsions. Moreover, even solid materials having liquid-like properties, such as fine-grained solids, e.g., based upon carbon, such as graphite, can also be conveyed by pumps according to the present teachings. Naturally, any other medium that can be conveyed by the pumps according to the present teachings are also included within the scope of the present teachings, even though not expressly mentioned herein.

Representative embodiments of the present teachings will now be described in more detail with the assistance of FIGS. 1 to 3.

Figure 1:
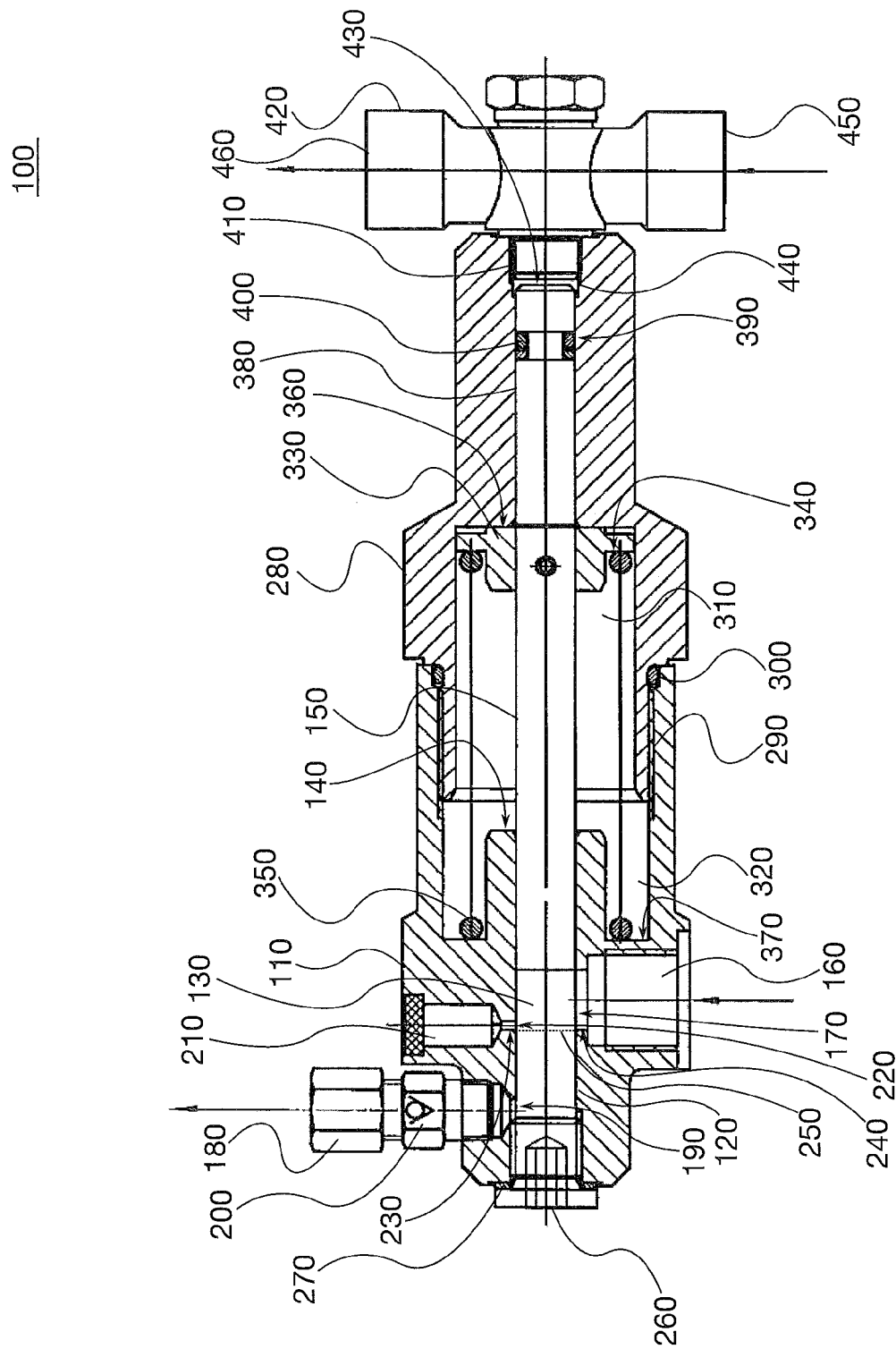
FIG. 1 shows a cross-sectional illustration of a pump according to one exemplary embodiment of the present teachings.

FIG. 1 shows a cross-section through a pump 100 according to a first exemplary embodiment of the present teachings. The pump 100 includes a pump body 110, inside of which a cylindrical bore 120 extends. A portion of the bore 120 forms at least a portion of a pump chamber 130.

A piston 150 (pump piston) extends through one opening 140 of the pump body 110 into the bore 120. The bore 120 and the piston 150 are preferably designed relative to each other such that the piston 150 is capable of sufficiently sealing the pump chamber 130 relative to the opening 140 with consideration of the viscosity of the to-be-conveyed medium, e.g. a lubricant. However, different tolerances of the bore 120 and piston 150 relative to each other can be utilized depending upon the to-be-conveyed medium. In addition, one or more seal elements optionally may be disposed between the piston 150 and the bore 120, so that the tolerances may be further reduced, if desired.

The pump body 110 further includes a pump inlet 160 having an inlet opening 170 in the pump chamber 130. As will be discussed below, the to-be-conveyed medium preferably arrives in the pump chamber 130 in an unpressurized state via the pump inlet 160. Furthermore, the pump body 110 includes an outlet 180 that comprises an outlet opening 190 in the pump chamber 130. The outlet 180 further comprises a check valve 200 configured to prevent or at least substantially reduce back flow of the conveyed medium from the outlet 180 (pump outlet) into the pump chamber 130. Consequently, the check valve 200 in the outlet 180 is configured to at least temporarily stop a back flow of the medium into the pump chamber 130 through the outlet opening 190.

The pump body 110 further comprises a ventilation device 210 having a ventilation opening 220 (ventilation bore) in the pump chamber 130. The ventilation opening 220 is different and separate from the inlet opening 170 and the outlet opening 190. In the embodiment of the pump 100 shown in FIG. 1, an edge 230 of the ventilation opening 220 facing towards the outlet opening 190 is aligned with an edge 240 of the inlet opening 170 facing towards the outlet opening 190, as indicated by the dotted line 250 in FIG. 1. Therefore, during one reciprocating movement of the piston 150, the inlet opening 170 and the ventilation opening 220 are at least substantially simultaneously opened and closed, respectively, by the piston 150.

The pump 100 depicted in FIG. 1 further includes a plug 260 affixed to the pump body 110 via a seal 270 disposed at an opening of the bore 120. This opening is opposite of the opening 140 in the axial direction of the bore 120. The plug 260 seals the pump chamber 130 on the left side of FIG. 1 and also may serve as a stop for the piston 150.

In addition to the (first) pump body 110, the pump 100 further includes a second pump body 280 that is configured to be mechanically connectable with the pump body 110 via a thread 290 and a seal 300. The second pump body 280 includes a bore 310 that forms or defines a concentric hollow space with a recess 320 of the pump body 110 when the two pump bodies 110, 280 are connected. The piston 150 extends into the concentric hollow space. A ring 330 is mechanically attached to the pump body 110 on the side of the piston 150 that faces away from the pump body 110. The ring 330 includes a shoulder 340, against which a compression spring 350 applies a force to the ring 330 in the assembled state of the two pump bodies 110, 280 and thus presses the ring 330 against an end face 360 of the bore 310 of the second pump body 280. The compression spring 350 is supported on an end face 370 of the recess 320 of the pump body 110.

In the pump 100 shown in FIG. 1, the piston 150 extends through the bore 310 of the second pump body 280 into another bore 380 that is designed to be concentric to the bore 120. Furthermore, the piston 150 has a tapered segment 390 that extends into the other bore 380. A seal 400 is attached at the tapered segment 390. In the pump 100 shown in FIG. 1, the seal 400 is formed by two O-rings and seals the piston 150 relative to the other bore 380.

A T-shaped connecting piece 420 is configured to attach to a control line (not shown in FIG. 1) and is screwed together with the second pump body 280 via an inner thread 410 located in the other bore 380 of the second pump body 280. As a result, a hollow space 440 is formed adjacent to an end face 430 of the piston 150. The hollow space 440 lies within the other bore 380 of the second pump body 280 and is in direct contact or fluid communication with the not-shown control line. Thus, if a gas, a gas mixture, a liquid or another medium is introduced or supplied through a first control connector 450 or a second control connector 460 of the connecting piece 420, the medium in question can also flow into the hollow space 440 and will apply a force proportional to the pressure of the medium to the end face 430 of the piston 150. In this case, the piston 150 will move (slide) within the bores 380, 120 against the force of the compression spring 350 from the base position shown in FIG. 1 towards the left.

The pump 100 shown in FIG. 1 may be, e.g., a hydraulic used-grease pump, in which the pump inlet 160 is coupled with or is in fluid communication with a source of used-grease, e.g., a grease outlet port or exhaust of a bearing. In this case, the used-grease can be supplied from the bearing either directly or indirectly via pipes, channels or bores or other hydraulic or pneumatic components or systems through the inlet opening 170 into the pump chamber 130. A coupling of an inlet or an outlet is thus also to be understood in this context to be a hydraulic coupling or connection.

The outlet 180 of the pump 100 can be coupled with or in fluid communication with a used-grease collection container, as will be further discussed with regard to FIG. 2 below. In this case, grease that has arrived in the pump chamber 130 can be conveyed from the pump 100 via the outlet 180 into the used-grease collection container.

A representative method for operating the pump 100 of FIG. 1 will now be described.

At the beginning of a pump cycle, the pump piston 150 is located in its base position, as is shown in FIG. 1. The piston 150 is pressed or biased by the compression spring 350 against the right stop shown in FIG. 1, which is formed by the end face 360. As a result, the pump chamber 130 is open via the inlet opening 170.

When the piston 150 is located in its base position, the used-grease can enter into the pump chamber 130 in an "unpressurized state" from its source, e.g., a machine component such as a bearing. The used-grease is moved only using a force or forces, which it is subjected to anyways during operation. For example, the used-grease may be moved into the pump chamber 130 by one or more of centrifugal force generated by rotation of the machine component, a diffusion force, a hydrodynamic or a hydrostatic force, another inertial force and/or simply gravity. Any of these forces may be utilized to transport the used-grease towards the inlet 160 of the pump 100. In other words, it is preferably that the used-grease arrives in the pump chamber 130 substantially at atmospheric pressure and without using a vacuum or suctioning means, such as a vacuum pump that actively draws the used-grease out of the machine component. Rather, the used-grease is allowed to passively move from the machine component to the pump chamber 130 without altering the pressure experienced (or least not significantly) by the used-grease during the transport.

Due to the ventilation device 210, the pump 100 is capable of facilitating this unpressurized transport of the medium (e.g., used-grease) into the pump chamber 130, so that the to-be-conveyed medium is not directly suctioned into the pump chamber 130 from the corresponding source. By only using forces that naturally occur in the machine component or system, the danger of insufficient lubrication can thus be reduced without requiring a costly tuning or adjusting of the respective amounts of grease that must be supplied into the machine component and conveyed out (exhausted) from machine component at the same time. Moreover, the construction of the lubricating system can be simplified, if desired, since additional functional units, such as check valves or other flow controllers, can be omitted, if desired.

The ventilation device 210 is either directly or indirectly connected or in fluid communication with a reservoir of gas or a gas mixture, so that pressure equalization is possible between the pump chamber 130 and the reference pressure of the gas or the gas mixture. The gas or gas mixture can be the ambient air around the machine component, in which the pump 100 is integrated. In other words, the pump chamber 130 can be connected with the surrounding atmosphere via the ventilation device 210 such that pressure equalization can take place by using the air surrounding the machine.

However, other gas sources or gas mixture sources, e.g., compressed gas cylinders, can be pneumatically coupled with the ventilation device 210 in order to facilitate this pressure equalization. As a result, the likelihood of the formation of a partial vacuum (negative pressure) in the pump chamber 130 during operation of the pump can be reduced at least temporarily, if desired at least substantially or even completely prevented.

Starting from the base position shown in FIG. 1, the piston 150 is moved towards the left in FIG. 1 by applying pressure to the end face 430 of the piston 150, so that the piston 150 initially passes over the inlet opening 170 and then it subsequently passes over the ventilation opening 220. Due to the above-described arrangement of the edges 230, 240 of the two openings 170, 220, these openings 170, 220 are closed substantially simultaneously by the piston 150. Furthermore, the movement of the piston 150 causes the medium collected in the pump chamber 130 to be conveyed out of the pump 100 through the outlet opening 190 and the outlet 180.

In other words, during a first movement phase, the piston 150 can convey the medium collected in the pump chamber 130 through the outlet opening 190 out of the pump 100 by moving the movable component of the pump 100 away from the base position shown in FIG. 1.

A second movement phase then follows the first movement phase and can be initiated by the pump 100 shown in FIG. 1, e.g., by reducing the pressure applied to the end face 430 of the piston 150. In this case, the compression spring 350 will force the piston 150 to move or slide back towards its base position. In addition, a back flow of the medium into the pump chamber 130 is stopped by the check valve 200. Once the piston 150 reaches the position, in which the inlet opening 170 and the ventilation opening 220 of the ventilation device 210 are substantially simultaneously opened, pressure equalization takes place in the interior of the pump chamber 130 by the gas or gas mixture flowing into the pump chamber 130 via the ventilation device 210. As a consequence, fresh medium (to be pumped or conveyed in the next pumping cycle) can arrive in the pump chamber 130 via the inlet opening 170 in a substantially unpressurized manner, i.e. at least substantially at atmospheric pressure.

Figure 2:
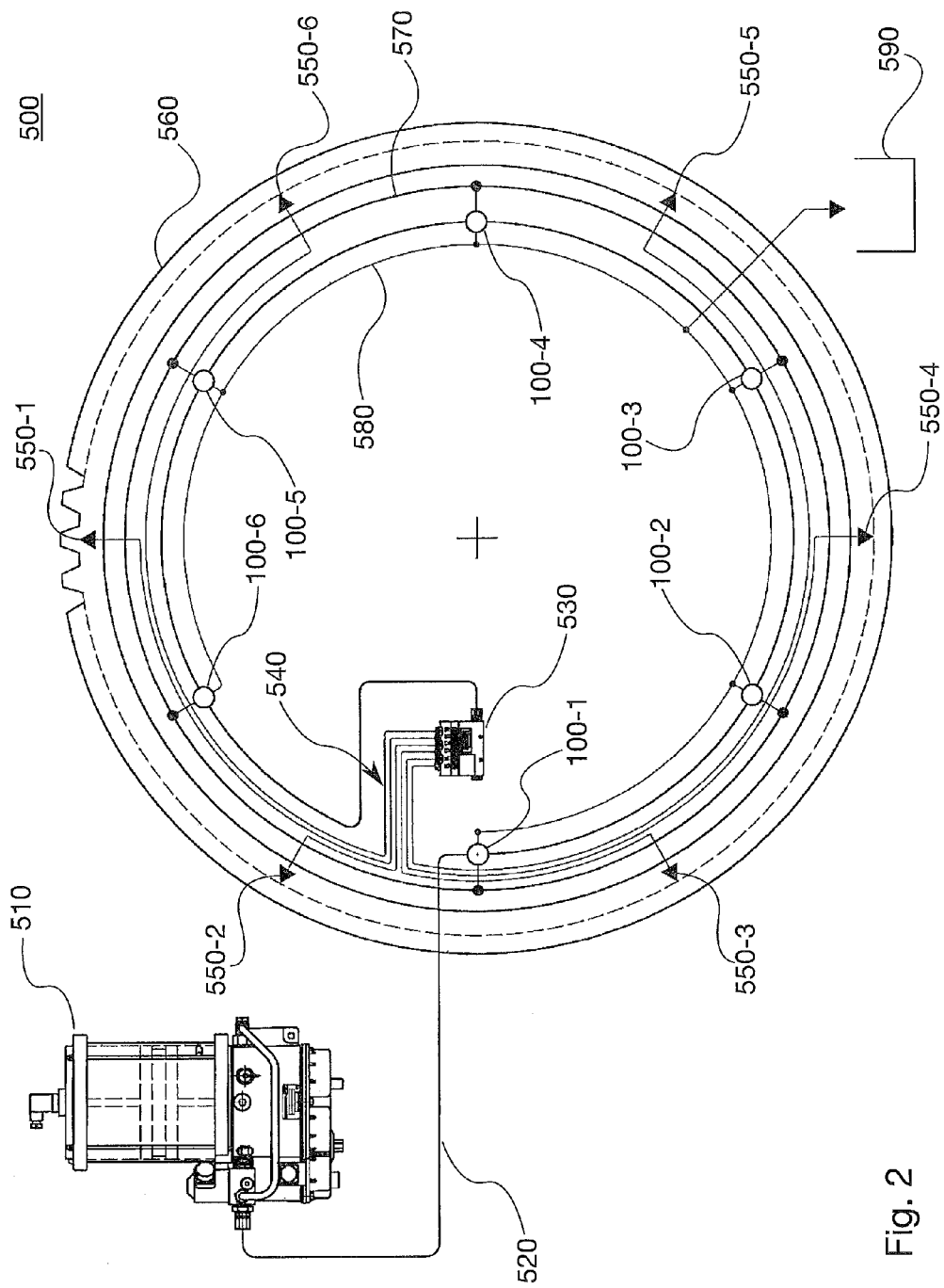
FIG. 2 shows a schematic illustration of a lubricating system according to one exemplary embodiment of the present teachings.

The pumping principle of the pump shown in FIG. 1 therefore generally corresponds to a hydraulically-driven, single-piston pump that is designed to receive used-grease from a bearing or another machine components via the pump inlet 160 into the pump chamber 130 and then pump or convey the used-grease via the outlet 180 into a collection container (shown in FIG. 2).

When the pressure increases in the main line (shown in FIG. 2), the pressure increase is communicated via the connecting piece 420 to the pump piston 150, which moves towards the left in FIG. 1 so as to pass over the intake bore 170 and the ventilation bore 220. This movement pushes the used-grease collected in the pump chamber 130 towards the outlet 180. When the pressure in the main line is reduced, the compression spring 350 then pushes the pump piston 150 back again towards the right stop, which is formed by the end face 360 of the second pump body 280, into the base position of the piston 150. When passing over the pump input 170 and the ventilation bore 220, any partial vacuum or negative pressure that may be been generated in the pump chamber 130 is quickly equalized, so that a suctioning of the to-be-conveyed medium is substantially avoided or prevented. The used-grease can now collect in the pump chamber 130 in an unpressurized (atmospheric) state until the next conveying/pumping operation.

Therefore, the present representative embodiment provides the advantage that the used-grease is not suctioned out of the bearing or other machine components. As a result, the partial vacuum that normal occurs in conventional pumps is prevented or at least reduced. Only the surplus used-grease that is exhausted from the bearing due to one of the above-mentioned forces arrives in the pump 100. Consequently, it is no longer necessary to individually customize the ratio of the amounts of supplied lubricant and exhausted used-grease, which was typically required in conventional pump. As a result, the risk of suctioning too much grease out of the machine component (e.g., the bearing) and the possible insufficient lubrication problems connected therewith can be at least substantially decreased.

FIG. 2 shows a schematic illustration of a lubricating system 500 according to an exemplary embodiment of the present teachings. The lubricating system 500 includes an input pump 510. The input of the input pump 510 is coupled or in fluid communication with a lubricant reservoir (not shown in FIG. 2) and the output of the input pump 510 is coupled or in fluid communication with one or a plurality of pumps 100 (as described above or below) via a main line 520, which was described above.

In the representative embodiment of the lubricating system 500 shown in FIG. 2, six hydraulic used-grease pumps 100-1, . . . , 100-6, are connected in series via the two control connectors 450, 460 (see FIG. 1). The second control connector 460 of the last pump 100-6 is coupled or in fluid communication with the input side of a distributor 530, e.g., a piston distributor, so that the lubricant conveyed via the main line 520 serves not only to control the pumps 100 via their control connectors 450, 460, but also controls the lubricant that is distributed to the machine elements 550 via the distributor 530 and a corresponding number of distributor lines 540.

FIG. 2 shows the respective machine elements 550 in a simplified manner as triangular symbols 550-1, . . . , 550-6. More precisely stated, FIG. 2 shows a gear ring 560 of a pitch bearing of a wind turbine. The respective pump inlets 160 of the pumps 100 are directly coupled to or in fluid communication with the respective grease exhaust (outlet) ports in the gear ring 560 via an intermediate line 570. Depending upon the particular design of the lubrication system 500, this coupling can be implemented, e.g., by mounting the pumps directly in bores formed in the corresponding components (e.g., directly in the gear ring 560), or also by providing an attachment or fastening device (e.g., a mounting ring).

When the gear ring 560 rotates, a centrifugal force acts on the grease and causes the used-grease to move towards the pumps 100. As a result, the used-grease collects in the pump chambers 130 of the pumps 100 and can then be conveyed in the above-described pressing (movement) phase, i.e. when pressure is applied to the end face 430 of the piston 150 of the pump 100 via the input pump 510, out of the respective pumps 100 and into a used-grease collection (transport) line 580. The used-grease collection line 580 may be coupled to or in fluid communication with a collection container 590 via a connecting device or line (not shown in FIG. 2).

During the pressing (piston movement) phase, the pump pistons 150 are hydraulically driven by the input pump 510 (as was described above) in order to push any used-grease, which has collected in the pump chambers 130 of the pumps 100, towards the respective outlets 180 of the pumps 100. The pump pressure of the pumps 100 begins to be generated when the piston 150 has passed over the ventilation bore 220 and the associated edge 230 of the inlet opening 170.

When the pressure applied by the input pump 510 is subsequently reduced again, the pumps 100 (i.e. the pistons 150) return to their respective base positions due to restoring force of the compression springs 350, so that the pump chambers 130 of the pumps 100 are again ready to receive used-grease. The used-grease pumping phase (piston movement phase) may occur cyclically (e.g., at regular intervals) or periodically (e.g., at irregular intervals) to convey the used-grease to the collection container 590.

Naturally, in exemplary embodiments of the present teachings, as many pumps 100 can be provided in a row, e.g., before the piston distributor 530, as is necessary. While FIG. 2 shows a representative lubrication system having six grease ports and a corresponding number of distributor lines 540, the number of pumps and the number of the corresponding distributor lines can be customized independent of each other based upon the particular application.

Furthermore, a pressure relief valve can also be integrated into the main line 520 of the lubricating system shown in FIG. 2 in order to prevent, e.g., excessive fluid pressure within the main line 520. Such an optional pressure relief valve can be expedient, because the pumps 110 are driven by the input pump 510 in the embodiment shown in FIG. 2 as well as in the pump shown in FIG. 1. Thus, the piston 150 of the pumps 100 must be pressed against the corresponding springs 350. If the pressure applied to the piston 150 by the input pump 510 exceeds a predetermined threshold for the lubricating system 500, damage could result. Therefore, a pressure relief valve may be advantageously utilized with the present teachings to avoid such problems.

By using the lubricating system, as is shown in FIG. 2 in an exemplary manner, as well as the corresponding hydraulic pumps 100, it is possible to replace previously-known collection containers that had to be directly attached to or near the bearing in order to collect the exhausted used-grease. By merging or combining the outputs of the pump outlets 180 of the pumps 100 via the used-grease collection line 580, the entire amount of used-grease exhausted from the machine element 550 can thus be conveyed into one or a plurality of collection containers 590 via a common line. The used-grease that is exhausted or discharged from the machine element 550 due to rotational movement of the machine element 550 (e.g., a roller bearing) can be conveyed to an arbitrary number of collection flasks. The disposal and the mounting of new flasks, which is often very time-consuming, can therefore be simplified or reduced, if desired even completely avoided. In this case, it may be possible to achieve considerable cost savings, since service intervals can be lengthened in certain circumstances.

Figure 3:
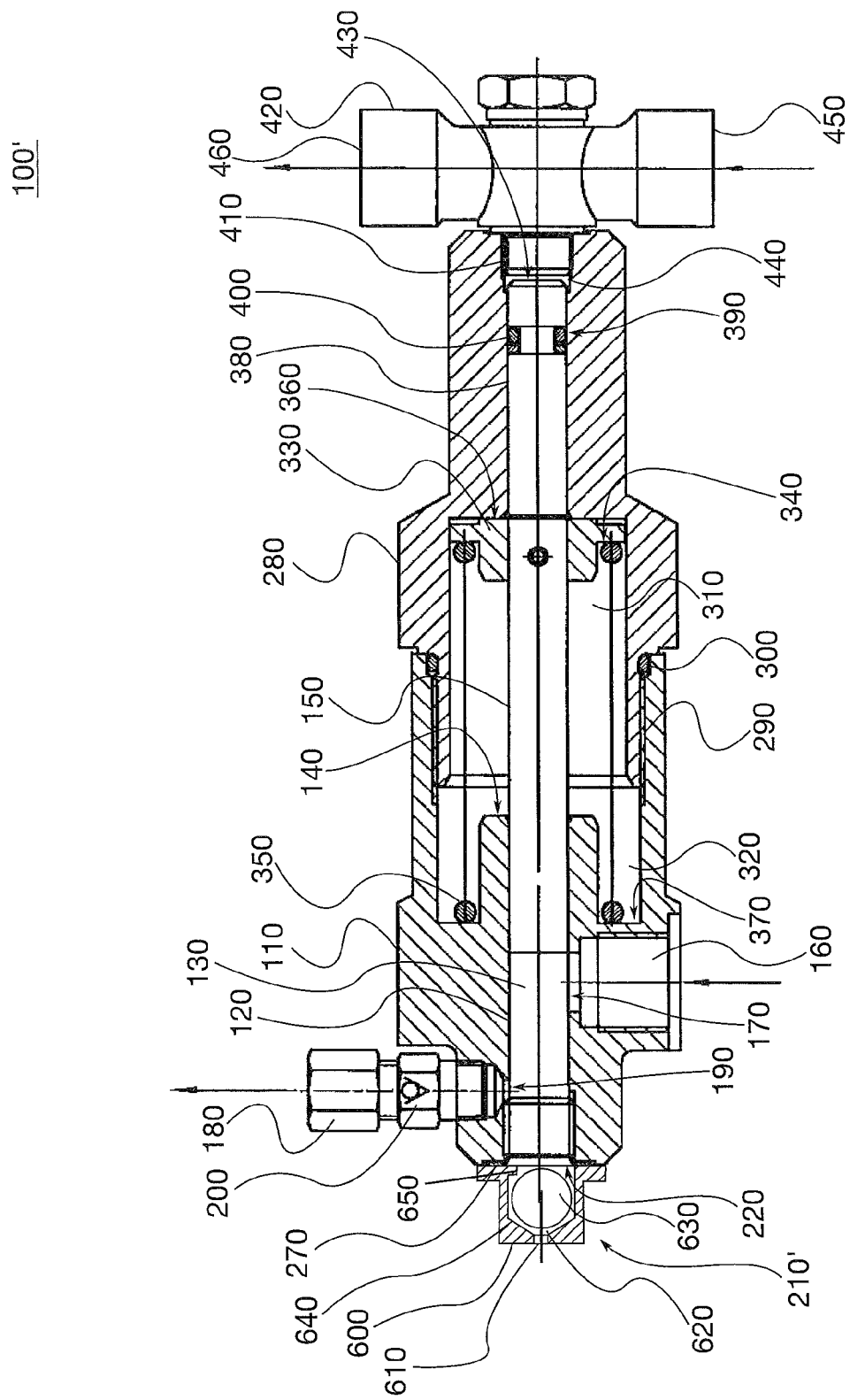
FIG. 3 shows a cross-sectional illustration of a pump having a ventilating valve according to another exemplary embodiment of the present teachings.

FIG. 3 shows a cross-section through another pump 100' according to another exemplary embodiment of the present teachings, which differs from the pump 100 shown in FIG. 1 only in two aspects. First, the pump 100' omits the stop 260 on the pump body 110. Second, the ventilation device 210 is embodied differently. Instead, the pump 100' shown in FIG. 3 includes a ventilation device 210' that is attached to the seal 270 at the point where the stop 260 is attached to the pump 110 of FIG. 1. As a result, the ventilation opening 220 is disposed opposite of the opening 140 of the pump body 110 in the embodiment of FIG. 3.

The ventilation device 210' further comprises a ventilation valve 600 having an outer ventilation opening 610 that opens into a hollow space 620. A ball 630 serves as a seal element and is axially movable within the hollow space 620 between a beveled end face 640 and a shoulder 650 of the ventilation valve 600. The ball 630 and the beveled end face 640 are designed to provide a fluid-tight seal when the ball 630 is pressed against the beveled end face 640. On the other hand, the shoulder 650 is only partially formed around the circumference of the hollow space 620, so that fluid (e.g., air or another gas) can flow from the ventilation opening 610 into the pump chamber 130 when the ball 630 is pressed against the shoulder 650. As will be described below, the ball 630 facilitates a pressure equalization within the pump chamber 130 during each movement of the piston 150 towards its base position.

The ventilation valve 600 may be embodied as kind of a check valve, e.g., such that air (or air pressure) communicated through the outer ventilation opening 610 will press the ball 640 against the shoulder 650 when a partial vacuum or negative pressure exists in the interior of the pump chamber 130, as compared to a reference pressure (e.g., the ambient air surrounding the pump 100'). Because a fluid communication path is established between the outer ventilation opening 610 and the interior of the pump chamber 130, it is possible for the pressure within the pump chamber 130 to equalize with the ambient air (or other gaseous source) in this state.

On the other hand, when the piston 150 moves towards the left in FIG. 3 and the medium (e.g. used-grease), which has collected in the pump chamber 130, moves towards the outlet opening 190, the pressure in the interior of the pump chamber 130 will exceed the pressure acting on the ball 630 via the outer ventilation opening 610. Therefore, the ball 630 will be pressed against the beveled end face 640 of the ventilation valve 600, thereby sealing the outer ventilation opening 610. Depending upon the particular design of the ventilation valve 600, a supplemental sealing effect or force can be generated by the used-grease when it is pushed through the ventilation opening 220 into the ventilation valve 600.

The ventilation valve 600 can optionally also include a spring element that applies a supplemental force to the ball 630 or another corresponding seal element, so that the sealing effect of the ventilation valve 600 will be overcome at a different pressure difference between the pressure in the interior of the pump chamber 130 and the reference pressure (ambient air). As was indicated above, this reference pressure can be provided by the ambient air pressure, i.e. by the pressure prevailing in the surroundings of the pump 100', or also can be defined by supplying another gas or gas mixture, e.g., at a pressure above atmospheric pressure. In other words, the ventilation valve 600 can be configured so that is opens when a predetermined pressure difference exists between the pressure within the pump chamber 130 and the reference pressure. As a result, any partial vacuum or a negative pressure that has developed in the pump chamber 130 relative to the reference pressure is reduced or eliminated.

Of course, embodiments of the present teachings are not limited to the detailed embodiments described in the present application. For example, various alternative constructions of the pumps 100 can be utilized. For example, while the pump bodies 110, 280 of the exemplary embodiments shown in FIGS. 1 and 3 are designed to be separately mounted, e.g., using brackets or mounting rings, these pump bodies can instead be directly integrated into bores or channels of machine components in the form of sleeves or corresponding adapters. Also, a retro-fit of already-existing systems is possible, e.g., by utilizing appropriate brackets or mounting rings, which enable the pumps to be attached at different points.

Not only can the entire set of pumps 100, 100' be implemented differently, but also one or more of the pumps utilized in one system can also differ from each other with respect to other details than those described above. For example, a spring element other than the compression spring 350 can be utilized in order to urge or bias the piston 150 into its base position. For example, mechanical tension springs or pneumatic or hydraulic spring elements could be utilized instead of a compression spring.

In addition, the connections 160, 180 as well as the ventilation devices 210, 210' can be designed differently in different exemplary embodiments of the present teachings.

Furthermore, it is possible to drive the pumps 100, 100' not via a hydraulic circuit, as is shown in FIGS. 1 to 3, but rather by using a separate drive and/or a separate energy source. For example, it may be possible to use an existing hydraulic drive circuit within the system, rather than providing an additional hydraulic drive circuit. In the alternative, a pneumatic, electric or other type of drive technology may be utilized, e.g., an electric motor.

The piston 150 for the pumps 100, 100' shown in FIGS. 1 and 3 may be designed in another manner, so that the ventilation opening 220 and the intake opening 190 are disposed differently than the described manner. Also, the ventilation device 210, 210' can be designed, if desired, as a part of the piston 150, e.g., by providing an appropriate ventilation channel in the piston 150, which is in fluid communication with the pump chamber 130.

Furthermore, other types of pumps than the above-described piston pumps can also be utilized. For example, rotary vane pumps and other pumps can also be utilized as the basis for another exemplary embodiment of the present teachings. While the movable component 150 is a piston in the case of a piston pump, the movable component would be a rotary vane, e.g., in the case of a rotary vane pump. The rotary vane is accommodated in a rotor or is connected with a rotor. In principle however, other types of pumps could be utilized.

Lubricating systems according to exemplary embodiments of the present teachings are even less limited to the conveying of greases as the medium as the above-described pumps. Thus, other lubricants or lubricating means also can be conveyed, exhausted or supplied in further exemplary embodiments of the present teachings. In addition to the above-described oils and greases, emulsions or other bulk solid-type granulates or lubricant can be utilized, in principle, together with further exemplary embodiments of the present teachings. One example is a carbon-containing lubricant, such as a lubricant based on graphite.

Furthermore, embodiments of the present teachings can also be utilized in connection with bearings other than pitch bearings that are configured to adjust the blade angle of the rotor vane of a wind turbine. Thus, the present teachings can also be utilized in connection with outer- or inner rings of other bearing types, or can be integrated together with metering valves, adapters or other components. Corresponding intake openings 170 of the pumps 100 could thus be directly coupled with radially- or axially-extending bores, lines and channels of roller bearings.

Embodiments of the present teachings can be utilized not only for receiving used-grease and other lubricants from bearings and for conveying the used-grease to collection containers, but also could be utilized, in principle, in connection with other media, in which an "unpressurized" transport into the interior of the pump chamber is advantageous. Examples of such applications include, but are not limited to, lubricating systems and corresponding pumps of wind turbines, tidal power generators, turbines, construction machines and other large machines, in which used lubricant is conveyed or exhausted away from the associated machine parts or machine elements in an "unpressurized" manner, i.e. substantially at atmospheric pressure. Thus, in addition to the already-mentioned systems, excavators, apparatus for transporting and for processing construction materials, lifting vehicles, apparatus in road construction, apparatus for sewer pipes and pipelines, compacting apparatus, tunnel construction apparatus, compressor apparatus or cleaning apparatus also can be operated using embodiments of the present teachings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pumps and lubricating systems, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100, 100' Pump
110 Pump body
120 Bore
130 Pump chamber
140 Opening
150 Piston
160 Pump inlet
170 Inlet opening
180 Outlet
190 Outlet opening
200 Check valve
210, 210' Ventilation device
220 Ventilation opening
230 Edge for ventilation opening
240 Edge for intake opening
250 Line
260 Stop
270 Seal
280 Second pump body
290 Thread
300 Seal
310 Bore
320 Recess
330 Ring
340 Shoulder
350 Compression spring
360 End face
370 End face
380 Another bore
390 Tapered segment
400 Seal
410 Inner thread
420 Connecting piece
430 End face
440 Hollow space
450 First control connector 460 Second control connector
500 Lubricating system
510 Input pump
520 Main line
530 Distributor
540 Distributor line
550 Machine element
560 Gear ring
570 Intermediate line
580 Used-grease collection line
590 Collection container
600 Ventilation valve
610 Outer ventilation opening
620 Hollow space
630 Ball
640 Beveled end face
650 Shoulder

The invention claimed is:

1. A pump configured to convey a medium, comprising:
a pump chamber having an intake opening and an outlet opening,
a movable component located in the pump chamber and configured to be at least partially movable in the pump chamber in a first direction so as to convey a batch of the medium from the intake opening to the outlet opening and in a second direction opposite the first direction, and
a vent having a ventilation opening in fluid communication with the pump chamber, the ventilation opening being different than the intake opening and the outlet opening,
wherein the movable component is configured to open the vent opening by moving in the second direction.

2. The pump according to claim 1, wherein the vent is configured to selectively permit a gas or a gas mixture to flow into the pump chamber via the ventilation opening.

3. The pump according to claim 2, wherein the movable device is configured to open the vent opening and the intake opening substantially simultaneously.

4. The pump according to claim 2, wherein the vent comprises a valve openable in response to a predetermined pressure difference between a pressure within the pump chamber and a reference pressure being exceeded.

5. The pump according to claim 4, wherein:
the pump is configured to cyclically or periodically move the movable component from a base position in a first movement phase and to return the movable component to the base position in a second movement phase,
the movable component is configured to convey a batch of the medium disposed in the pump chamber to the outlet opening during the first movement phase, and
the vent is configured to reduce or at least substantially prevent the formation of the partial vacuum in the pump chamber during the second movement phase.

6. The pump according to claim 5, wherein the pump is a piston pump, the movable component is a piston and the pump chamber includes at least one cylinder segment, in which the piston at least partially extends in a movable manner.

7. A lubricating system configured to convey a batch of the medium away from a bearing of one of a wind turbine, a tidal power system, a turbine and a construction machine to a used lubricant collection container, the medium being a lubricant and the lubricating system comprising:
the pump according to claim 6,
a lubricant exhaust of the bearing in fluid communication with the intake opening of the pump and configured to convey lubricant, which has been exhausted from the bearing, to the pump,
a connector in fluid communication with the outlet opening of the pump and being configured to provide the lubricant conveyed by the pump to the used lubricant collection container, and
an input pump in fluid communication with the bearing so as to convey fresh lubricant to a lubricant supply of the bearing,
wherein the lubricating system is configured to receive lubricant, which has been exhausted from the bearing, in the pump chamber of the pump via the intake opening and to convey said lubricant out of the pump chamber via the outlet opening at least substantially without a partial vacuum forming in the pump chamber.

8. The pump according to claim 1, wherein the movable device is configured to open the vent opening and the intake opening substantially simultaneously.

9. The pump according to claim 1, wherein:
the pump is configured to cyclically or periodically move the movable component from a base position in a first movement phase and to return the movable component to the base position in a second movement phase,
wherein the movable component is configured to convey a batch of the medium disposed in the pump chamber to the outlet opening during the first movement phase, and
the vent is configured to reduce or at least substantially prevent the formation of the partial vacuum in the pump chamber during the second movement phase.

10. The pump according to claim 1, wherein the pump is a piston pump, the movable component is a piston and the pump chamber includes at least one cylinder segment, in which the piston at least partially extends in a movable manner.

11. A lubricating system configured to convey a batch of the medium away from a machine element to a used lubricant collection container, the medium being a lubricant and the lubricating system comprising:
the pump according to claim 1,
a lubricant exhaust of the machine element in fluid communication with the intake opening of the pump, and
a connector in fluid communication with the outlet opening of the pump and being configured to provide the lubricant conveyed by the pump to the used lubricant collection container,
wherein the lubricating system is configured to receive lubricant, which has been exhausted from the machine element, in the pump chamber of the pump via the intake opening and to convey said lubricant out of the pump chamber via the outlet opening at least substantially without generating a partial vacuum in the pump chamber.

12. The lubricating system according to claim 11, wherein the machine element is a bearing of one of a wind turbine, a tidal power system, a turbine and a construction machine.

13. The lubricating system according to claim 12, further comprising:
an input pump in fluid communication with the machine element and configured to convey fresh lubricant to a lubricant supply of the machine element,
wherein the pump is a piston pump and the movable component is a piston that is in fluid communication with an output of the input pump, the piston being movable away from a base position to convey a batch of lubricant from the pump chamber through the outlet opening when subjected to an elevated pressure applied by the input pump, and wherein the pump includes a return element configured to move the piston back to the base position when the pressure applied by the input pump decreases.

14. A method for conveying a medium, comprising:
receiving a batch of the medium in a pump chamber of a pump via an intake opening of the pump chamber;
moving a pump element in a first manner to convey the batch of the medium to an outlet opening of the pump chamber;
moving the pump element in a second manner that would create a partial vacuum in the pump chamber in the absence of a vent; and
at least temporarily venting the pump chamber when moving the pump element in the second manner.

15. The method according to claim 14, wherein the medium is at least substantially incompressible.

16. The method according to claim 15, wherein the medium is supplied to the pump chamber without using a vacuum or suction force.

17. The method according to claim 16, wherein the ventilating step comprises:
opening a vent in fluid communication with the pump chamber in response to a predetermined pressure difference occurring between a pressure within the pump chamber and a reference pressure.

18. The method according to claim 14 including sealing the pump chamber from the ambient atmosphere during the conveying.

19. A pump configured to convey a medium, comprising:
a pump chamber having an intake opening and an outlet opening,
a piston slidably mounted in the pump chamber for axial movement between a first position and a second position, the piston having an end, the end being located at the intake opening when the piston is in the first position, and the end being axially spaced from the intake opening when the piston is in the second position, the piston being configured to convey a batch of the medium toward the outlet opening when shifting from the first position to the second position, and
a vent configured to be opened by the movement of the piston from the second position toward the first position, the vent being configured to place the pump chamber in fluid communication with an ambient atmosphere at least when the pump chamber is in fluid communication with the intake opening.

20. The pump according to claim 19, wherein the vent is configured to be closed by the movement of the piston from the first position toward the second position.

* * * * *